Nov. 25, 1958  E. V. SUNDT  2,861,481
SPEED REDUCER
Filed April 3, 1957  2 Sheets-Sheet 1
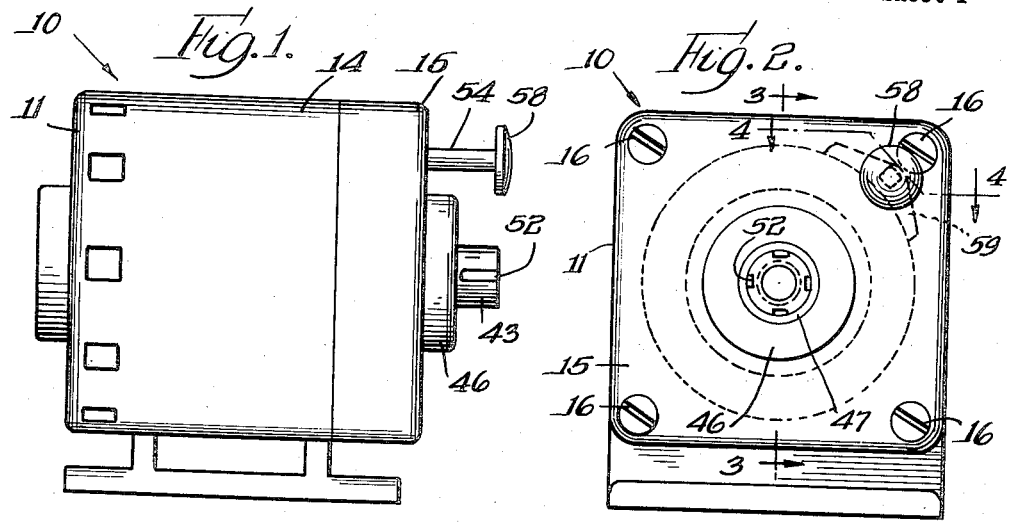
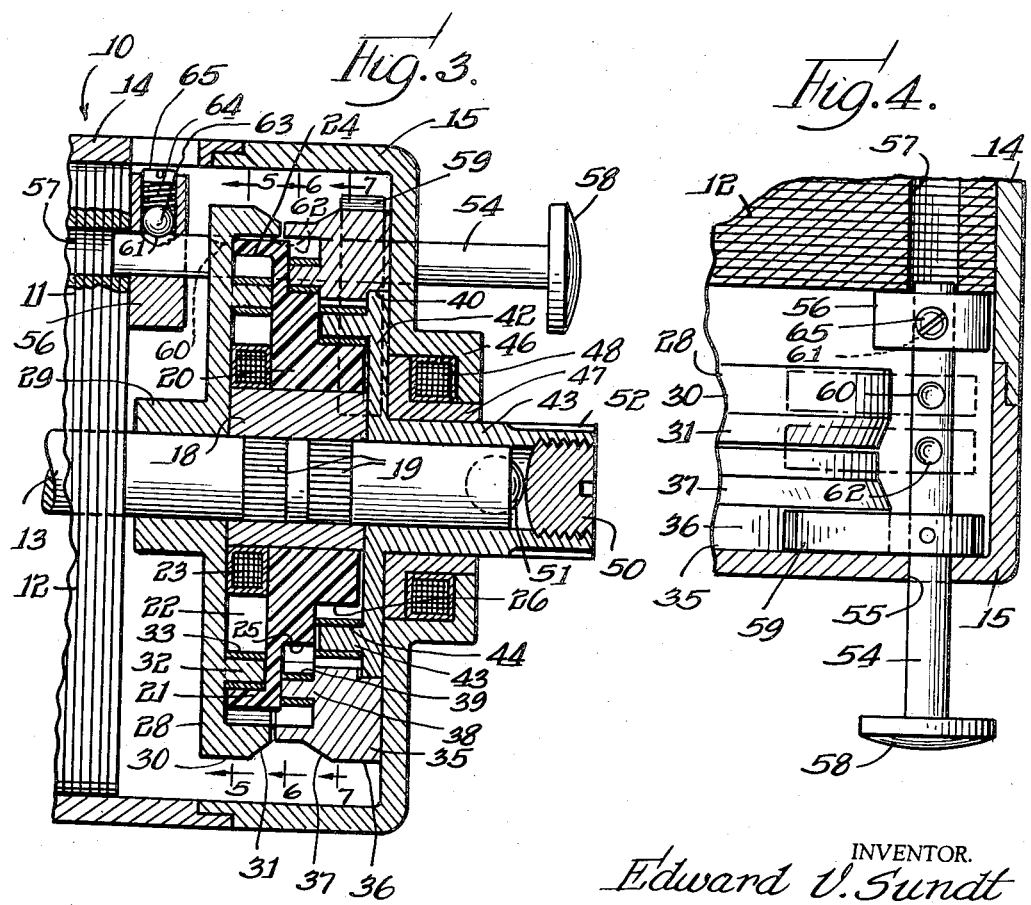
INVENTOR.
Edward V. Sundt
BY
Wallenstein + Spangenberg
attys.

Nov. 25, 1958   E. V. SUNDT   2,861,481
SPEED REDUCER
Filed April 3, 1957
2 Sheets-Sheet 2
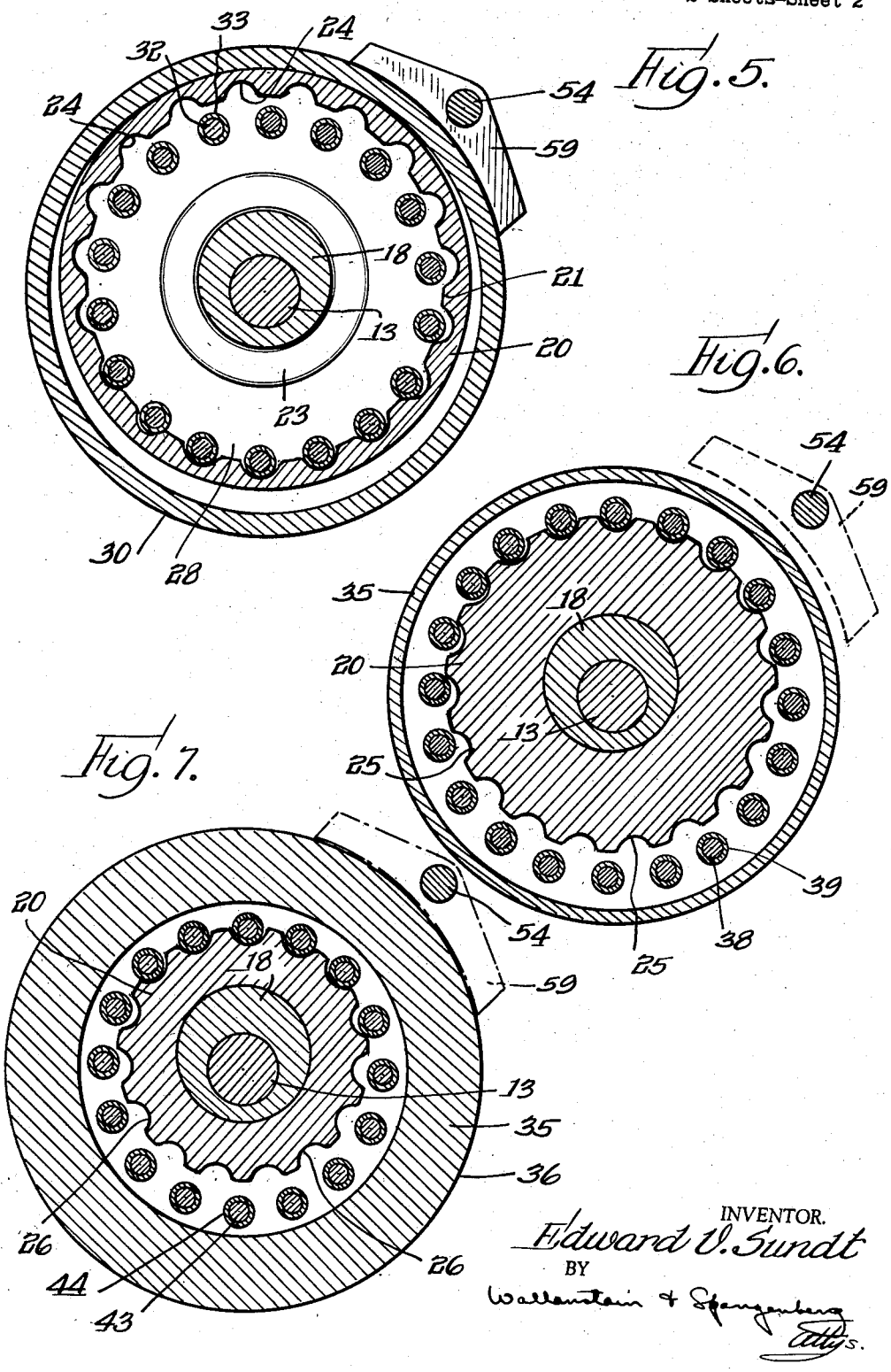
INVENTOR.
Edward V. Sundt
BY
Wallenstein & Spangenberg
Attys.

United States Patent Office 2,861,481
Patented Nov. 25, 1958

2,861,481

SPEED REDUCER

Edward V. Sundt, Wilmette, Ill.

Application April 3, 1957, Serial No. 650,340

11 Claims. (Cl. 74—760)

This invention is directed to a speed reducer and more particularly to a multiple speed reducer, and this application is a continuation-in-part of my copending application Serial No. 547,129, filed November 16, 1955.

The principal object of this invention is to provide an improved speed reducer wherein low speed reduction ratios may be obtained in a simple manner with minimum space requirements, wherein lower manufacturing costs may be realized and greater flexibility of operation obtained, wherein the speed reducer may be readily incorporated in an electric motor to provide a compact motorized speed reducer mechanism, wherein high speed reduction ratios may also be obtained, wherein both low and high speed reduction ratios may be conveniently selectively obtained, and wherein frictional losses are maintained at a minimum.

Briefly, the speed reducer of this invention includes a rotating shaft, an eccentric carried by the shaft for rotation therewith, and a member rotatably mounted on the eccentric and oscillated thereby. The member has a first ring of gear teeth, and in the case of a multiple speed reducer it also has a second ring of gear teeth. The member also has a third ring of gear teeth. A first toothed gear meshes with the first ring of gear teeth on the member and means are provided for securing this first toothed gear against rotation so that it will react against the member to control the rotation thereof. In the case of a multiple speed reducer, a second toothed gear is also provided for meshing with the second ring of gear teeth on the member and means are also provided for securing this second toothed gear against rotation so that it will react against the member to control the rotation thereof. Means are provided for selectively securing the first and second toothed gears against rotation so that either toothed gear may selectively control the rotation of the member.

A third toothed gear meshes with the third ring of gear teeth on the member and the third toothed gear, which is the output gear, is rotated by the member. The first toothed gear has less teeth than the first ring of gear teeth on the member so that, when the first toothed gear is secured against rotation, the member is rotated in the same direction as the shaft is rotated but at a reduced speed depending upon the gear ratio utilized. The third toothed gear has more teeth than the third ring of gear teeth on the member so that, as the member is oscillated, it rotates the third toothed gear with respect to the member in the same direction as the shaft is rotated but at a reduced speed depending upon the gear ratio utilized. Accordingly, the third toothed gear is driven in the same direction as the shaft is rotated at a resultant speed which is the sum of the speeds of rotation of the member and of the third toothed gear with respect to the member, thereby providing low speed reduction ratios.

The second toothed gear has more teeth than the second ring of gear teeth on the member, and when the second toothed gear is selectively secured against rotation, the member is rotated in a direction opposite to the direction of rotation of the shaft. Accordingly, the third toothed gear is driven at a resultant speed which is the difference between the speeds of rotation of the member and of the third toothed gear with respect to the member. Preferably, the speed reduction ratio between the second toothed gear and the member is less than the speed reduction ratio between the member and the third toothed gear, so that the third toothed gear is driven in the same direction as the shaft is rotated. Thus, when the second toothed gear is secured against rotation, high speed-reduction ratios are obtained.

The first, second and third toothed gears are preferably concentrically arranged about the rotating shaft, the first and third toothed gears being rotatably mounted on the shaft and the second toothed gear being rotatably mounted on the third toothed gear, to provide a compact speed reducer assembly. Where the speed reducer is combined with an electric motor, it is preferably located on the motor shaft within the electric motor housing, the third toothed gear being provided with a sleeve encompassing the motor shaft and extending outwardly from the motor housing through a suitable shaft opening therein.

The first ring of gear teeth on the member comprises internal gear teeth and the second and third rings of gear teeth comprise external gear teeth, and the first toothed gear has external gear teeth and the second and third toothed gears have internal gear teeth, thus, the larger numbers of teeth being arranged at larger pitch diameters and the smaller numbers of teeth at smaller pitch diameters. The differences between the pitch diameters of the various meshing teeth are the same inasmuch as they are all controlled by the same eccentric, and preferably the pitch diameters of the first and second rings of gear teeth are made the same. To reduce to a minimum the frictional loss in the gear reducer, the rings of gear teeth on the member take the form of substantially semi-cylindrical recesses and the teeth on the toothed gears take the form of pin supported sleeve rollers engageable in the semi-cylindrical recesses.

The means for selectively securing the first and second toothed gears against rotation preferably includes magnetically permeable cylindrical surfaces on the toothed gears, a magnet, and means for movably mounting and selectively engaging the magnet with the magnetically permeable surfaces on the toothed gears. This provides a simple and foolproof selecting mechanism which provides for speed reduction selection without clashing of gears, and which allows slippage in the event of overload conditions to prevent damage to the speed reducer mechanism.

Further objects of this invention reside in the details of construction of the speed reducer, and in the co-operative relationships between the component parts thereof.

Other objects and advantages of this invention will become apparent to those skilled in the art upon reference to the accompanying specification, claims and drawings, in which:

Fig. 1 is a side elevational view showing the speed reducer of this invention in combination with an electric motor;

Fig. 2 is an end elevational view looking from the right of Fig. 1;

Fig. 3 is an enlarged vertical sectional view through the speed reducer taken substantially along the line 3—3 of Fig. 2;

Fig. 4 is a horizontal sectional view taken substantially along the line 4—4 of Fig. 2;

Figs. 5, 6 and 7 are vertical sectional views through the speed reducer taken substantially along the lines 5—5, 6—6 and 7—7, respectively, of Fig. 3.

Referring first to Figs. 1 to 4, the speed reducer of this invention is generally designated at 10, and it is illustrated as being applied to and driven by an electric motor 11 having a motor field structure 12 controlling an armature (not shown) for rotating a shaft 13, the motor also including a housing 14 having an end housing portion 15 secured in place by tie bolts 16. The speed reducer is arranged concentrically about the motor shaft 13 and is located within the housing portion 15 of the electric motor.

The speed reducer includes an eccentric 18 secured to the shaft 13 in any suitable manner as by flutes 19. The eccentric 18 is preferably formed from powdered iron or the like which is impregnated with a suitable lubricant. Rotatably mounted on the eccentric 18 is a member 20 which is also oscillated by the eccentric as the eccentric is rotated by the shaft 13. This member 20 is preferably formed of nylon or the like, it being shaped by a suitable molding process. The eccentric 20 is formed at one end with a concentric flange 21 providing a cavity 22 in which is located a lubricant impregnated wick 23 to aid in lubricating the parts of the speed reducer. The inside of the flange 21 is provided with a first ring of internal gear teeth 24 which consist of inwardly facing substantially semi-cylindrical recesses. The member 20 is also provided with second and third rings 25 and 26 of external gear teeth consisting of outwardly facing substantially semi-cylindrical recesses. The ring 24 of internal gear teeth and the rings 25 and 26 of external gear teeth are spaced longitudinally along the length of the member 20.

A first toothed gear 28 is rotatably mounted on the shaft 13 by means of a hub 29 and preferably this first toothed gear 28 is formed of powdered iron or the like, which is impregnated with a suitable lubricant. This first toothed gear 28 is provided with a peripheral overhang having an outer cylindrical surface 30 terminating in a frusto-conical surface 31. The toothed gear 28 is arranged adjacent the eccentric 18 and the member 20 and it is provided with external gear teeth in the form of integral pins 32 carrying sleeve rollers 33, the sleeve rollers 33 being engageable in the outwardly facing recesses of the first ring 24 of gear teeth on the member 20. As the shaft 13 and the eccentric 18 are rotated, the member 20 is oscillated and the first ring of gear teeth 24 on the member 20 mesh with the teeth on the first toothed gear 28, and when the toothed gear 28 is secured against rotation, the toothed gear 28 reacts against the member 20 to control the rotation of the member 20.

A second toothed gear 35 is provided with an outer cylindrical surface 36 terminating in a frusto-conical surface 37, this second toothed gear 35 also being preferably formed of powdered iron or the like which has been impregnated with a suitable lubricant. The second toothed gear 35 is provided with internal gear teeth in the form of integral pins 38 carrying sleeve rollers 39 which are engageable with the semi-cylindrical recesses of the second ring 25 of gear teeth on the member. As the shaft 13 and eccentric 18 are rotated, the member 20 is oscillated and the second ring 25 of gear teeth on the member 20 mesh with the gear teeth 38, 39 on the second toothed gear 35, and when the second toothed gear 35 is secured against rotation, the second toothed gear 35 reacts against the member 20 to control the rotation of the member 20.

The second toothed gear 35 is provided with an annular recess 40 for rotatably mounting the same on a third toothed gear 42, which, in turn, is rotatably mounted on the shaft 13 by a sleeve hub 43 encompassing the shaft 13. This third toothed gear 42 is also preferably formed of powdered iron or the like which is impregnated with a suitable lubricant. The third toothed gear 42 is provided with internal gear teeth in the form of a plurality of integral pins 43 carrying sleeve rollers 44 which sleeve rollers 44 are engageable in the semi-cylindrical recesses of the third ring 26 of gear teeth on the member 20. As the shaft 13 and the eccentric 18 are rotated, the member 20 is oscillated and, due to the meshing of the third ring 26 of gear teeth on the member, and the gear teeth 43, 44 on the third toothed gear 42, the third toothed gear 42 is rotated.

The speed reducer, including the eccentric 18, the member 20, and the three toothed gears 28, 35 and 42, form a compact unit which is concentrically arranged about and mounted on the motor shaft 13 so that it may be readily assembled on the motor shaft 13 with minimum space requirements, and, as illustrated, it may be incorporated within the housing of the electric motor. The housing portion 15 of the electric motor is provided with a hollow boss 46 which receives a powdered bronze bearing 47, the space between the boss 46 and bearing 47 being provided with a lubricant impregnated wick 48 for lubricating purposes. The sleeve hub 43, which encompasses the shaft 13, extends outwardly through the bearing 47 to provide a power takeoff from the speed reducer. The sleeve hub 43 is preferably internally threaded to receive a plug 50 which engages a ball 51 carried by the end of the motor shaft 13 to provide for end play adjustment. The bearing 47, in addition to acting as a bearing support for the sleeve hub 43 also acts as an outboard bearing support for the outer end of the motor shaft 13. The outer end of the sleeve hub 43 is provided with splines 52 to facilitate the attachment of a driven mechanism thereto.

A rod 54 is slidably mounted in a hole 55 in the housing portion 15 and in a hole in a bracket 56 suitably secured to the motor housing 14 adjacent the field structure 12. The rod 54 may be slid inwardly and outwardly by a knob 58, such sliding movement being permitted by a suitable hole 57 in the field structure 11. A permanent magnet 59 having a cylindrical concave surface is rigidly secured to the rod 54 and is movable to three positions with respect to the speed reducer, these three positions being determined by recesses 60, 61 and 62 in the rod 54 engageable by a ball 63 carried in the bracket 56 and spring pressed against the rod 54 by means of a spring 64 interposed between the ball 63 and a cap 65 carried by the bracket.

When the rod 54 is moved to an intermediate position where the recess 60 is engaged by the ball 63, the magnet 59 is positioned between the cylindrical surfaces 30 and 36 on the first and second toothed gears 28 and 35, respectively. Thus, the magnet 59, in this position, has no effect upon rotation of the first and second toothed gears 28 and 35. If, however, the rod 54 is pulled outwardly so that the recess 61 is engaged by the ball 63, the magnet 59 is moved into engagement with the cylindrical surface 36 on the second toothed gear 35, and due to the high magnetic permeability of the second toothed gear 35, that gear is secured against rotation. When this occurs, the second toothed gear 35 reacts against the member 20 to control the rotation of the member 20. When the rod 54 is pushed inwardly so as to cause the recess 62 to be engaged by the ball 63, the magnet 59 is shifted into engagement with the cylindrical surface 30 on the first toothed gear 28, and operates to secure the first toothed gear 28 against rotation due to the high magnetic permeability thereof. When this occurs, the first toothed gear 28 reacts against the member 20 to control the rotation of the member 20. By reason of this manual manipulation of the rod 54 by the knob 58, desired speed reduction ratios may be obtained, and the speed reducer may also be shifted to a neutral position where no output is obtained. When the rod 54 is shifted to either operative position for desired speed reduction ratio operation, and if an overload condition should occur, the first or third toothed gears 28 and 35 may slip with respect to the magnet 59 so as to prevent the building up of undue stresses in the speed reducer which might result in breakage thereof or damage thereto.

For purposes of illustration herein, it is assumed that the first toothed gear 28 has 18 teeth, that the first ring 24 of gear teeth on the member has 19 teeth, that the second toothed gear 35 has 20 teeth, that the second ring 25 of gear teeth on the member has 19 teeth, that the third toothed gear 42 has 16 teeth, and that the third ring 26 of gear teeth on the member has 15 teeth. Since the first toothed gear 28 has less teeth than the first ring 24 of gear teeth on the member, the member 20 is rotated in the same direction as the shaft 13 is rotated, but at a reduced speed depending upon that gear ratio, when the first toothed gear 28 is secured against rotation. Since the third toothed gear 42 has more teeth than the third ring 26 of gear teeth on the member, the member, as it is oscillated, rotates the third toothed gear 42 with respect to the member 20 in the same direction as the shaft 13 is rotated, but at a reduced speed, depending upon the gear ratio utilized. Accordingly, the third toothed gear 42 is driven in the same direction as the shaft 13 is rotated at a resultant speed which is the sum of the speeds of rotation of the member 20 and of the third toothed gear 42 with respect to the member 20, thereby providing low speed reduction ratios.

The formula for determining the speed reduction ratio between the third or output toothed gear 42 and the shaft 13 may be expressed as follows:

$$\text{Ratio} = \frac{1 - \frac{ac}{bd}}{1}$$

where $a$, $b$, $c$, and $d$ are the numbers of teeth, respectively, on the first toothed gear 28, the number of teeth in the first ring 24 of gear teeth, the number of teeth in the third ring 26 of gear teeth, and the number of teeth on the third toothed gear 42. By substituting the appropriate values, the speed reduction ratio becomes $$\text{Ratio} = \frac{\left(1 - \frac{18 \times 15}{19 \times 16}\right)}{1} = \frac{8.97}{1}$$

Thus it is seen that a low speed reduction ratio is obtained because the eccentric operates to rotate both the member 20 and the third toothed gear 42 in the same direction as the shaft 13 is rotated. Various low speed reduction ratios may be obtained by appropriately selecting gear ratios between the first toothed gear 28, the member 20 and the third toothed gear 42.

When the selecting mechanism is operated to secure the second toothed gear 35 against rotation, a high speed reduction ratio is obtained. Here, the second toothed gear 35 has more teeth than the second ring 25 of gear teeth on the member 20, and, accordingly, the member 20 is rotated in a direction opposite to the direction of rotation of the shaft 13. As a result, the third toothed gear 42 is rotated at a resultant speed which is the difference between the speeds of rotation of the member 20 and of the third toothed gear 42 with respect to the member 20. The speed reduction ratio between the second toothed gear 35 and the member 20 is less than the speed reduction ratio between the member 20 and the third toothed gear 42, so that the third toothed gear 42 is driven in the same direction as the shaft is rotated. When the appropriate numbers are substituted in the aforementioned formula, the high speed reduction ratio is as follows:

$$\text{Ratio} = \frac{\left(1 - \frac{20 \times 15}{19 \times 16}\right)}{1} = \frac{76}{1}$$

Thus, when the second toothed gear 35 is secured against rotation, high speed reductions are obtained and various high speed reductions may be obtained by the proper selection of the individual reduction ratios.

The first ring 24 of gear teeth on the member 20 are internal gear teeth and the second and third rings 25, 26 of gear teeth are external gear teeth, and the first toothed gear 28 has external gear teeth, and the second and third toothed gears 35 and 42 have internal gear teeth. Thus, the larger numbers of teeth are arranged at larger pitch diameters and the smaller numbers of teeth at smaller pitch diameters so as to provide maximum efficiency.

The differences between the pitch diameters of the various meshing teeth are made the same inasmuch as they are all controlled by the same eccentric. For purposes of this invention, the pitch diameters of the first and second rings 24 and 25 of gear teeth on the member 20, are made the same. Since the meshing teeth comprise substantially semicylindrical recesses and the pin supported sleeve rollers engageable in the recesses, a rolling action, as distinguished from a sliding action, is obtained, which greatly reduces frictional losses in the speed reducer.

If it is desired to have only one speed reduction ratio, a low speed reduction ratio, the second toothed gear 35 and the second ring 25 of gear teeth on the member 20 may be eliminated. Likewise, if it is desired to have only a high speed reduction ratio, the first toothed gear 28 and the first ring 24 of gear teeth on the member 20 may be eliminated. However, in accordance with this invention, selective low and high speed reduction ratios may be obtained in an extremely compact speed reducer unit without the need for appreciable additional space requirements.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. A speed reducer comprising a rotating shaft, an eccentric carried by the shaft for rotation therewith, a member rotatably mounted on the eccentric and oscillated thereby and having a first ring of internal gear teeth and a second ring of external gear teeth, a first toothed gear having external teeth meshing with the first ring of gear teeth and secured against rotation, and a second toothed gear having internal teeth meshing with the second ring of gear teeth and driven thereby, the first toothed gear having less teeth than the first ring of gear teeth for rotating the member in the same direction as the shaft is rotated but at a reduced speed, the second toothed gear having more teeth than the second ring of gear teeth for rotating the second toothed gear with respect to the member in the same direction as the shaft is rotated but at a reduced speed, the speed reduction ratio between the first toothed gear and the member being less than the speed reduction ratio between the member and the second toothed gear, whereby the second toothed gear is driven in the same direction as the shaft is rotated at a resultant speed which is the sum of the speeds of rotation of the member and of the second toothed gear with respect to the member.

2. A speed reducer comprising a rotating shaft, an eccentric carried by the shaft for rotation therewith, a member rotatably mounted on the eccentric and oscillated thereby and having a first ring of external gear teeth and a second ring of external gear teeth, a first toothed gear having internal gear teeth meshing with the first ring of gear teeth and secured against rotation, and a second toothed gear having internal gear teeth meshing with the second ring of gear teeth and driven thereby, the first toothed gear having more teeth than the first ring of gear teeth for rotating the member in the opposite direction as the shaft is rotated but at a reduced speed, the second toothed gear having more teeth than the second ring of gear teeth for rotating the second toothed gear with respect to the member in the same direction as the shaft is rotated but at a reduced speed, the speed reduction ratio between the first toothed gear and the member being less than the speed reduction ratio between the member and the second toothed gear, whereby the second toothed gear is driven in the same direction as the shaft is driven at a resultant speed which is the difference between the speeds of rotation of the member and of the second toothed gear with respect to the member.

3. A multiple speed reducer comprising, a rotating shaft, an eccentric carried by the shaft for rotation therewith, a member rotatably mounted on the eccentric and oscillated thereby and having a first ring of internal gear teeth, a second ring of external gear teeth and a third ring of external gear teeth, a first toothed gear having external gear teeth meshing with the first ring of gear teeth, a second toothed gear having internal gear teeth meshing with the second ring of gear teeth, a third toothed gear having internal gear teeth meshing with the third ring of gear teeth and driven thereby, means for selectively securing the first toothed gear and the second toothed gear against rotation to cause the same to react against the member to control the rotation of the member, the first toothed gear having less teeth than the first ring of gear teeth for rotating the member in the same direction as the shaft is rotated but at a reduced speed when the first toothed gear is secured against rotation, the second toothed gear having more teeth than the second ring of gear teeth for rotating the member in the opposite direction as the shaft is rotated but at a reduced speed when the second toothed gear is secured against rotation, the third toothed gear having more teeth than the third ring of gear teeth for rotating the third toothed gear with respect to the member in the same direction as the shaft is rotated but at a reduced speed, the speed reduction ratio between the second toothed gear and the member being less than the speed reduction ratio between the member and the third toothed gear, whereby the third toothed gear is driven in the same direction as the shaft is driven at one resultant speed which is the sum of the speeds of rotation of the member and of the third toothed gear with respect to the member when the first toothed gear is secured against rotation, and whereby the third toothed gear is driven in the same direction as the shaft is driven at another resultant speed which is the difference between the speeds of rotation of the member and of the third toothed gear with respect to the member when the second toothed gear is secured against rotation.

4. A multiple speed reducer comprising, a rotating shaft, an eccentric carried by the shaft for rotation therewith, a member rotatably mounted on the eccentric and oscillated thereby and having first, second and third rings of gear teeth thereon, a first toothed gear meshing with the first ring of gear teeth, a second toothed gear meshing with the second ring of gear teeth, a third toothed gear meshing with the third ring of gear teeth and rotatably driven by the member, the speed reduction ratios between the respective meshing rings of gear teeth and toothed gears being different, and means for selectively securing the first toothed gear and the second toothed gear against rotation to cause the same to react against the member to control the rotation of the member and hence the speed of rotation of the third toothed gear selectively as the first and second toothed gears are selectively secured against rotation, said selective securing means for the first and second toothed gears including magnetically permeable surfaces on the first and second toothed gears, a magnet, and means for movably mounting and selectively engaging the magnet with the magnetically permeable surfaces of the first and second toothed gears.

5. A multiple speed reducer comprising, a rotating shaft, an eccentric carried by the shaft for rotation therewith, a member rotatably mounted on the eccentric and oscillated thereby and having first, second and third rings of gear teeth thereon, a first toothed gear meshing with the first ring of gear teeth, a second toothed gear meshing with the second ring of gear teeth, a third toothed gear meshing with the third ring of gear teeth and rotatably driven by the member, the speed reduction ratios between the respective meshing rings of gear teeth and toothed gears being different, and means for selectively securing the first toothed gear and the second toothed gear against rotation to cause the same to react against the member to control the rotation of the member and hence the speed of rotation of the third toothed gear selectively as the first and second toothed gears are selectively secured against rotation, said selective securing means for the first and second toothed gears including magnetically permeable cylindrical surfaces on the peripheries of the first and second toothed gears, a magnet having a cylindrical concave surface corresponding to the cylindrical surfaces on the first and second toothed gears, and means for movably mounting and selectively engaging the concave cylindrical surface of the magnet with the cylindrical surfaces of the first and second toothed gears.

6. A speed reducer comprising a rotating shaft, an eccentric carried by the shaft for rotation therewith, a member rotatably mounted on the eccentric and oscillated thereby and having a first ring of internal gear teeth consisting of a plurality of inwardly facing substantially semi-cylindrical recesses and a second ring of external gear teeth consisting of a plurality of outwardly facing substantially semi-cylindrical recesses, a first toothed gear having external teeth meshing with the first ring of gear teeth and consisting of a plurality of pin supported sleeve rollers engageable in the inwardly facing semi-cylindrical recesses, the first toothed gear being secured against rotation, and a second toothed gear having internal teeth meshing with the second ring of gear teeth and consisting of a plurality of pin supported sleeve rollers engageable in the outwardly facing semi-cylindrical recesses, the second toothed gear being driven by the member, the first toothed gear having less teeth than the first ring of gear teeth for rotating the member in the same direction as the shaft is rotated but at a reduced speed, the second toothed gear having more teeth than the second ring of gear teeth for rotating the second toothed gear with respect to the member in the same direction as the shaft is rotated but at a reduced speed, the speed reduction ratio between the first toothed gear and the member being less than the speed reduction ratio between the member and the second toothed gear, whereby the second toothed gear is driven in the same direction as the shaft is rotated at a resultant speed which is the sum of the speeds of rotation of the member and of the second toothed gear with respect to the member.

7. A speed reducer comprising a rotating shaft, an eccentric carried by the shaft for rotation therewith, a member rotatably mounted on the eccentric and oscillated thereby and having a first ring of external gear teeth consisting of a plurality of outwardly facing substantially semi-cylindrical recesses and a second ring of external gear teeth consisting of a plurality of outwardly facing substantially semi-cylindrical recesses, a first toothed gear having internal teeth meshing with the first ring of gear teeth and consisting of a plurality of pin supported sleeve rollers engageable in the outwardly facing semi-cylindrical recesses, the first toothed gear being secured against rotation, and a second toothed gear having internal teeth meshing with the second ring of gear teeth and consisting of a plurality of pin supported sleeve rollers engageable in the outwardly facing semi-cylindrical recesses, the second toothed gear being driven by the member, the first toothed gear having more teeth than the first ring of gear teeth for rotating the member in the opposite direction as the shaft is rotated but at a reduced speed, the second toothed gear having more teeth than the second ring of gear teeth for rotating the second toothed gear with respect to the member in the same direction as the shaft is rotated but at a reduced speed, the speed reduction ratio between the first toothed gear and the member being less than the speed reduction ratio between the member and the second toothed gear, whereby the second toothed gear is driven in the same direction as the shaft is driven at a resultant speed which is the difference between the speeds of rotation of the member and of the second toothed gear with respect to the member.

8. A multiple speed reducer comprising, a rotating shaft, an eccentric carried by the shaft for rotation therewith, a member rotatably mounted on the eccentric and oscillated thereby and having a first ring of internal gear teeth consisting of a plurality of inwardly facing substantially semi-cylindrical recesses, a second ring of external gear teeth consisting of a plurality of outwardly facing substantially semi-cylindrical recesses, and a third ring of external gear teeth consisting of a plurality of outwardly facing substantially semi-cylindrical recesses, a first toothed gear having external gear teeth meshing with the first ring of gear teeth and consisting of a plurality of pin supported sleeve rollers engageable in the inwardly facing semi-cylindrical recesses, a second toothed gear having internal gear teeth meshing with the second ring of gear teeth and consisting of a plurality of pin supported sleeve rollers engageable in the outwardly facing semi-cylindrical recesses, a third toothed gear having internal gear teeth meshing with the third ring of gear teeth and consisting of a plurality of pin supported sleeve rollers engageable in the outwardly facing semi-cylindrical recesses, the third toothed gear being rotatably driven by the member, means for selectively securing the first toothed gear and the second toothed gear against rotation to cause the same to react against the member to control the rotation of the member, the first toothed gear having less teeth than the first ring of gear teeth for rotating the member in the same direction as the shaft is rotated but at a reduced speed when the first toothed gear is secured against rotation, the second toothed gear having more teeth than the second ring of gear teeth for rotating the member in the opposite direction as the shaft is rotated but at a reduced speed when the second toothed gear is secured against rotation, the third toothed gear having more teeth than the third ring of gear teeth for rotating the third toothed gear with respect to the member in the same direction as the shaft is rotated but at a reduced speed, the speed reduction ratio between the second toothed gear and the member being less than the speed reduction ratio between the member and the third toothed gear, whereby the third toothed gear is driven at one resultant speed which is the sum of the speeds of rotation of the member and of third toothed gear with respect to the member when the first toothed gear is secured against rotation, and whereby the third toothed gear is driven at another resultant speed which is the difference between the speeds of rotation of the member and of the third toothed gear with respect to the member when the second toothed gear is secured against rotation.

9. A multiple speed reducer comprising, a rotating shaft, an eccentric carried by the shaft for rotation therewith, a member rotatably mounted on the eccentric and oscillated thereby and having a first ring of internal gear teeth, a second ring of external gear teeth and a third ring of external gear teeth, a first toothed gear having external gear teeth meshing with the first ring of gear teeth, a second toothed gear having internal gear teeth meshing with the second ring of gear teeth, a third toothed gear having internal gear teeth meshing with the third ring of gear teeth and driven thereby, means for selectively securing the first toothed gear and the second toothed gear against rotation to cause the same to react against the member to control the rotation of the member, the first toothed gear having less teeth than the first ring of gear teeth for rotating the member in the same direction as the shaft is rotated but at a reduced speed when the first toothed gear is secured against rotation, the second toothed gear having more teeth than the second ring of gear teeth for rotating the member in the opposite direction as the shaft is rotated but at a reduced speed when the second toothed gear is secured against rotation, the third toothed gear having more teeth than the third ring of gear teeth for rotating the third toothed gear with respect to the member in the same direction as the shaft is rotated but at a reduced speed, the speed reduction ratio between the second toothed gear and the member being less than the speed reduction ratio between the member and the third toothed gear, whereby the third toothed gear is driven in the same direction as the shaft is driven at one resultant speed which is the sum of the speeds of rotation of the member and of the third toothed gear with respect to the member when the first toothed gear is secured against rotation, and whereby the third toothed gear is driven in the same direction as the shaft is driven at another resultant speed which is the difference between the speeds of rotation of the member and of the third toothed gear with respect to the member when the second toothed gear is secured against rotation, said selective securing means for the first and second toothed gears including magnetically permeable surfaces on the first and second toothed gears, a magnet, and means for movably mounting and selectively engaging the magnet with the magnetically permeable surfaces of the first and second toothed gears.

10. A multiple speed reducer comprising, a rotating shaft, an eccentric carried by the shaft for rotation therewith, a member rotatably mounted on the eccentric and oscillated thereby and having a first ring of internal gear teeth, a second ring of external gear teeth and a third ring of external gear teeth, a first toothed gear having external gear teeth meshing with the first ring of gear teeth, a second toothed gear having internal gear teeth meshing with the second ring of gear teeth, a third toothed gear having internal gear teeth meshing with the third ring of gear teeth and driven thereby, means for selectively securing the first toothed gear and the second toothed gear against rotation to cause the same to react against the member to control the rotation of the member, the first toothed gear having less teeth than the first ring of gear teeth for rotating the member in the same direction as the shaft is rotated but at a reduced speed when the first toothed gear is secured against rotation, the second toothed gear having more teeth than the second ring of gear teeth for rotating the member in the opposite direction as the shaft is rotated but at a reduced speed when the second toothed gear is secured against rotation, the third toothed gear having more teeth than the third ring of gear teeth for rotating the third toothed gear with respect to the member in the same direction as the shaft, is rotated but at a reduced speed, the speed reduction ratio between the second toothed gear and the member being less than the speed reduction ratio between the member and the third toothed gear, whereby the third toothed gear is driven in the same direction as the shaft is driven at one resultant speed which is the sum of the speeds of rotation of the member and of the third toothed gear with respect to the member when the first toothed gear is secured against rotation, and whereby the third toothed gear is driven in the same direction as the shaft is driven at another resultant speed which is the difference between the speeds of rotation of the member and of the third toothed gear with respect to the member when the second toothed gear is secured against rotation, said selective securing means for the first and second toothed gears including magnetically permeable cylindrical surfaces on the peripheries of the first and second toothed gears, a magnet having a cylindrical concave surface corresponding to the cylindrical surfaces on the first and second toothed gears, and means for movably mounting and selectively engaging the concave cylindrical surface of the magnet with the cylindrical surfaces of the first and second toothed gears.

11. A multiple speed reducer comprising, a rotating shaft, an eccentric carried by the shaft for rotation therewith, a member rotatably mounted on the eccentric and oscillated thereby and having a first ring of internal gear teeth consisting of a plurality of inwardly facing substantially semi-cylindrical recesses, a second ring of external gear teeth consisting of a plurality of outwardly facing substantially semi-cylindrical recesses, and a third ring of external gear teeth consisting of a plurality of outwardly facing substantially semi-cylindrical recesses, a first toothed gear having external gear teeth meshing with the first ring of gear teeth and consisting of a plurality of pin supported sleeve rollers engageable in the inwardly facing semi-cylindrical recesses, a second toothed gear having internal gear teeth meshing with the second ring of gear teeth and consisting of a plurality of pin supported sleeve rollers engageable in the outwardly facing semi-cylindrical recesses, a third toothed gear having internal gear teeth meshing with the third ring of gear teeth and consisting of a plurality of pin supported sleeve rollers engageable in the outwardly facing semi-cylindrical recesses, the third toothed gear being rotatably driven by the member, means for selectively securing the first toothed gear and the second toothed gear against rotation to cause the same to react against the member to control the rotation of the member, the first toothed gear having less teeth than the first ring of gear teeth for rotating the member in the same direction as the shaft is rotated but at a reduced speed when the first toothed gear is secured against rotation, the second toothed gear having more teeth than the second ring of gear teeth for rotating the member in the opposite direction as the shaft is rotated but at a reduced speed when the second toothed gear is secured against rotation the third toothed gear having more teeth than the third ring of gear teeth for rotating the third toothed gear with respect to the member in the same direction as the shaft is rotated but at a reduced speed, the speed reduction ratio between the second toothed gear and the member being less than the speed reduction ratio between the member and the third toothed gear, whereby the third toothed gear is driven at one resultant speed which is the sum of the speeds of rotation of the member and of third toothed gear with respect to the member when the first toothed gear is secured against rotation, and whereby the third toothed gear is driven at another resultant speed which is the difference between the speeds of rotation of the member and of the third toothed gear with respect to the member when the second toothed gear is secured against rotation, said selective securing means for the first and the second toothed gears including magnetically permeable surfaces on the first and second toothed gears, a magnet, and means for movably mounting and selectively engaging the magnet with the magnetically permeable surfaces of the first and second toothed gears.

References Cited in the file of this patent

UNITED STATES PATENTS

| | | |
|---|---|---|
| 1,641,766 | Laukhuff | Sept. 6, 1927 |
| 1,794,514 | Chase | Mar. 3, 1931 |

OTHER REFERENCES

Electronics, page 59, March 1954.